United States Patent
Yasukuni et al.

[11] Patent Number: 5,888,323
[45] Date of Patent: Mar. 30, 1999

[54] WATERPROOF CABLE AND METHOD OF MANUFACTURE THEREOF

[75] Inventors: Jun Yasukuni; Takashi Itoh, both of Yokkaichi, Japan

[73] Assignee: Sumitomo Wiring Systems, Ltd., Japan

[21] Appl. No.: 909,235

[22] Filed: Aug. 11, 1997

Related U.S. Application Data

[63] Continuation of Ser. No. 576,991, Nov. 13, 1995, abandoned.

[30] Foreign Application Priority Data

Dec. 28, 1994 [JP] Japan .................................. 6-338645

[51] Int. Cl.⁶ .................................................. B65H 81/06
[52] U.S. Cl. ............................................. 156/48; 156/51
[58] Field of Search .......................................... 156/48, 51

[56] References Cited

U.S. PATENT DOCUMENTS

| | | | |
|---|---|---|---|
| 2,957,038 | 10/1960 | Greenidge et al. | 174/23 R |
| 4,002,819 | 1/1977 | Woytiuk | 174/23 C |
| 4,164,245 | 8/1979 | Waling et al. | 174/102 P |
| 4,419,157 | 12/1983 | Ferrentino | 174/116 |
| 4,512,827 | 4/1985 | Gill | 174/102 P |
| 4,977,211 | 12/1990 | Doi et al. | 525/54.31 |
| 5,261,021 | 11/1993 | Pasta et al. | 174/23 R |
| 5,630,003 | 5/1997 | Arroyo | 385/113 |

FOREIGN PATENT DOCUMENTS

| | | |
|---|---|---|
| 61-18 52 18 | 11/1986 | Japan . |
| 21 06 14 | 1/1990 | Japan . |
| 5-15 18 48 | 6/1993 | Japan . |
| 68 44 16 | 3/1994 | Japan . |

*Primary Examiner*—Francis J. Lorin
*Attorney, Agent, or Firm*—Jordan B. Bierman; Bierman, Muserlian and Lucas

[57] ABSTRACT

A waterproof cable having a plurality of conductive strands which are twisted together to form a wire core which is surrounded by an insulation layer. A water-absorptive swellable powder is applied to the individual strands prior to twisting and thereby is introduced into the interstices between adjacent strands. If water attempts to enter the spaces between the strands, it is absorbed by the powder which swells to occupy all the space and thereby seals the cable against further water penetration. The cable is produced by application (e.g. by spraying) of a solution of the powder in a solvent to the individual strands. Thereafter, the solvent is evaporated, leaving the powder adhered to the strand surfaces. In a preferred form of the Invention, regions containing the powder are longitudinally spaced apart from adjacent regions having no powder therein. In a more preferred form of the Invention, the powder is removed from the outer surface of the wire core prior to coating with insulation. This facilitates stripping of the insulation layer when and where needed.

11 Claims, 2 Drawing Sheets

WATERPROOF CABLE AND METHOD OF MANUFACTURE THEREOF

This application is a continuation of application Ser. No. 08/576,991, filed Nov. 13, 1995, now abandoned.

This Application claims the priority of Japanese Application 6-338645, filed Dec. 28, 1994.

The present Invention relates to a waterproof cable and a method of its manufacture; more particularly, it prevents longitudinal water permeation due to capillary action from an end of the cable which is exposed to water. It is, therefore, preferably used as part of an automobile wire wire harness where o water permeation into the cable is apt to occur.

BACKGROUND OF THE INVENTION

Cable of the type to which the present Invention is directed consists of a wire core covered by a coat of insulation. The core comprises a plurality of individual strands which have been twisted together, resulting in a certain amount of clearance between adjacent conductive strands. Therefore, if the insulation is removed and the core exposed, water can be drawn into the spaces between the wires by capillary action. This can continue through a substantial length of the cable, causing discoloration and corrosion of the wire strands. Moreover, if the water reaches the opposite end of the cable, it can enter the inside of the housing to which the cable terminal is connected. Thus, not only the wire strands, but also the connector housing and the connector itself can be corroded thereby.

To solve this problem, various expedients have been proposed. For instance, in the method of Japanese Unexamined Patent Publication (Hei) 5-151848, after coating by introducing a waterproof material into the interstices between the strands, a rubber insulating separator tape, having a higher melting point than that of the waterproof material, is applied to the periphery of the wire core. The rubber and plastic insulation is then coated thereon. By covering the cable with the insulation after applying the separator tape longitudinally, the deformation that would be caused by pressure on the surface of the waterproof material can be avoided, thus assuring water-tightness and excellent appearance of insulator.

The method of the aforementioned Japanese Publication brings the exposed portion of the wire core into contact with a meltable waterproof organic insulating material. This material has a melting point of more than 50° C. and a viscosity of less than 200 centipoise. As a result, a filling layer is formed between the wire core and the insulation. The end of the cable is immersed in the waterproof material and a vacuum is applied to the other end of the cable. The negative pressure thus created causes the waterproof material to enter between the wire strands, thereby sealing the cable.

However, the foregoing prior art method possesses certain disadvantages. Although the waterproof material is forced between the strands by coextrusion of the strands and the material, it is nearly impossible to fill the small clearances, because the waterproof material for the inner layer is pressed inwardly from the periphery after the cable has been stranded. In addition, since the cable is heated after application of the waterproof material, the latter is extruded as an outer layer, followed by extrusion of a separate tape to be wrapped around the periphery of the outer layer. This means that a large number of process steps are required; therefore, productivity is low, leading to higher cost. In addition, when peeling off the insulating coating to expose the wire core before crimping on a wire terminal, a problem arises because the necessity for removing the separator tape, waterproof material of the outer layer, and waterproof material of the inner layer.

According to the method of Japanese Unexamined Patent Publication (Hei) 2-10614, as shown in FIG. 6, the exposed conductive area connected to a terminal is dipped into a fluid tank containing a melted electrically-insulating organic substance. With this method, as the terminal is also coated, it is necessary to provide a further process step to remove the substance from the terminal surface.

Another known manufacturing method is that of Japanese Unexamined Patent Publication (Hei) 6-84416. In this process, it is problematical as to whether the vacuum applied to one end of the cable will find its way through the spaces between the wire strands to the other end which is immersed in the sealing agent. There is, of course, no guarantee that the interstrand clearances will be continuous from one end of the cable to the other. Moreover, even if the vacuum does reach the other end, it is likely that the sealing agent will be unable to flow all the way to the end to which the vacuum is applied. Therefore, a suitable waterproof seal throughout the length of the cable will probably not be achieved.

SUMMARY OF THE INVENTION

The present Invention is intended to prevent water from permeating through the clearance between the wire strands. Moreover, it is a further purpose of the present Invention to produce a waterproof cable without any of the difficulties which the prior art methods and cables have encountered.

To solve the foregoing problems, a highly water-absorptive resin powder is applied to the outer surfaces of the individual wire strands. These strands are then twisted, in a conventional manner, to form the wire core. The absorptive resin powder is introduced into the spaces between the strands so that, when water penetrates from one end of the cable, the powder, upon absorbing the water, swells and cuts off any further penetration. Thus, in a very simple and economic manner, an extremely reliable seal is obtained.

In a second embodiment of the Invention, the resin powder is applied to the strands circumferentially at longitudinally' spaced apart intervals. In another embodiment of the present Invention, the resin powder is not introduced between the outer surface of the wire core and the inner surface of the external insulation.

To produce the cable as described herein, the highly water-absorptive resin powder is dissolved in a solvent and sprayed onto the plurality of wire strands prior to the formation of the wire core. The solvent is permitted to evaporate, with the addition of heat if desired, and the strands are then twisted to form the wire core. It is preferable that the evaporation take place subsequent to the twisting step, but this is not essential. Thereafter, a coating of insulation is applied to the surface of the wire core to complete the process.

In a preferred form of the method, it has been found desirable to provide an interval between the spraying of the wire strands and their formation into the wire core. The application of the solution to the strands is not critical. It can be carried out by spraying, injection, dropwise, continuous flow in the absence of pressure, and the like. In a particularly preferred form of the invention, the resin powder is removed from the surface of the wire core prior to application of the insulating coating.

While a wide variety of resin powders are suitable for use as the water-absorptive material, starch-acrylic acid graft copolymers, polyacrylic acid chloride, and gelatinized vinyl acetate-acrylic ester graft copolymers have been found particularly advantageous. Furthermore, the particle sizes of the powders are desirably 1 µm to 50 µm, preferably 5 µm to 10 µm. If the powder is less than 5 µm, it has a tendency to agglomerate and may become somewhat coarse. If the particles are larger than 10 µm, they do not adhere as well to the wire strands. The solvent is also not critical, but organic liquids such as toluene have been found preferable.

BRIEF DESCRIPTION OF THE DRAWINGS

In the accompanying drawings, constituting a part hereof, and in which like reference characters indicate like parts.

DETAILED DESCRIPTION OF THE INVENTION

Figure 1:
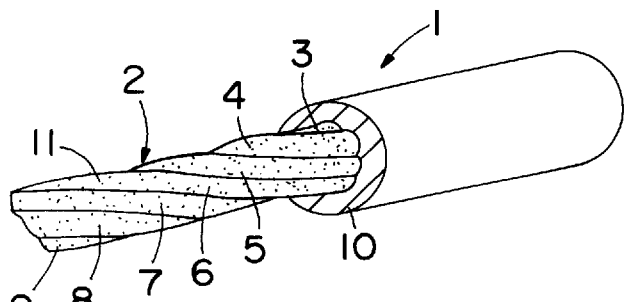
FIG. 1 is a perspective view of a waterproof cable according to the present invention.
Figure 2:
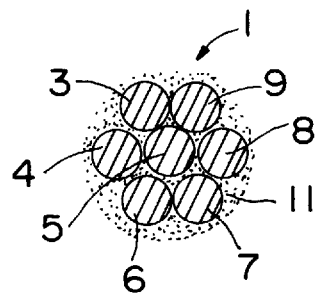
FIG. 2 is a transverse sectional view of the stripped portion of the cable of FIG. 1.

As shown in FIGS. 1 and 2, waterproof cable 1 is composed of a plurality of conductive strands 3 to 9 which have been twisted together to form wire core 2. Swellable water-absorptive resin powder 11 adheres to each of the individual strands 3 to 9. Surrounding wire core 2 is insulation 10.

Thus, if water attempts to flow into the interstices between the various strands, it encounters resin powder 11. Due to its nature, powder 11 will absorb the water and swell in the process of doing so, thereby filling up and sealing any spaces through which the water might otherwise flow. As a result, the cable is entirely watertight.

Figure 3:
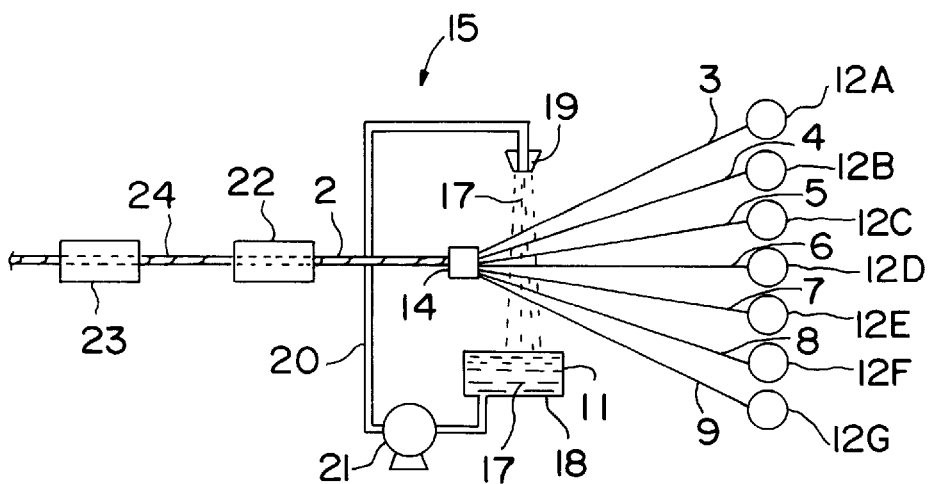
FIG. 3 is a schematic view of a device for the manufacture of the cable of FIG. 1.

The method of manufacture of cable 1 is shown schematically in FIG. 3. Strands 3 through 9 are fed into the apparatus from supply rolls 12A to 12G, respectively. Resin powder 11 is dissolved in solution 17 contained in fluid tank 18. Pump 21 drives solution 17 through pipe 20 from which it exits at nozzle 19. As FIG. 3 shows, solution 17 contacts each strand individually and coats its entire periphery.

Thereafter, the individually coated strands enter die 14 where they are twisted to form wire core 2. Core 2 is conveyed through dryer 22 where the solvent of solution 17 is evaporated, leaving resin powder 11. Thereafter, dried core 24 is coated with insulation 10 in extruder 23.

Figure 4:
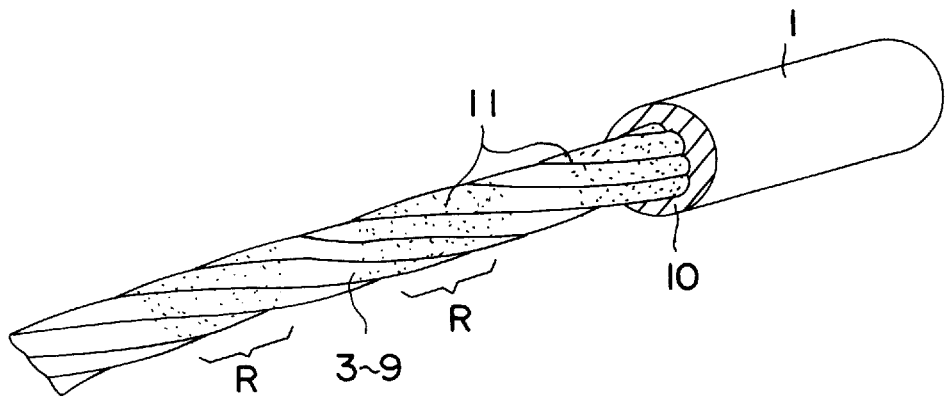
FIG. 4 is a perspective view, similar to that of FIG. 1, of another embodiment of the cable of the present Invention.
Figure 5:
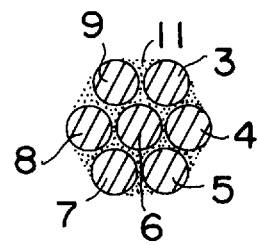
FIG. 5 is a transverse sectional view of the stripped portion of the cable of FIG. 4.
Figure 6:
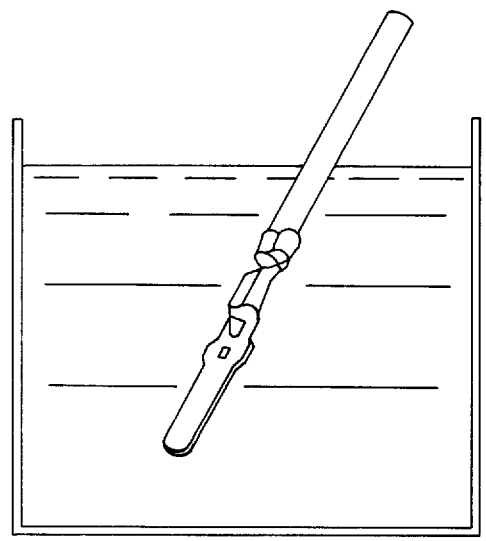
FIG. 6 is a schematic view of a manufacturing process according to the prior art.

In another embodiment of the Invention, solution 17 is sprayed intermittently on strands 3 through 9. As a result, cable 1 as shown in FIG. 4 is produced. As can be seen therefrom, resin powder 11 is to be found only at regions R and the longitudinal portions between regions R are untreated. In this form of the device, a certain minimal amount of water flow (from an untreated end of cable 1) to the first region R is permitted. However, once the water reaches resin powder 11 at region R, its flow is stopped. In this form of the Invention, regions R can be advantageously located at the ends of cable 1 where terminals are located and connections are to be made. As a result, water is prevented from entry, but the diameter of cable 1 is not increased throughout its length by the presence of powder 11.

In a modification of the process of the present Invention, a device for removing powder 11 from the surface of wire core 2 is located between stranding dye 14 and dryer 22. One form of this device comprises apparatus for pressing adhesive tape against the surface of wire core 2. Resin powder 11 adheres to the tape and is removed from the surface of wire core 2. Alternatively, wire core 2 can be subjected to a stream of air which will blow powder 11 off the surface of wire core 2. Thus, insulation 10 can easily be stripped from wire core 2 without interference from resin powder 11; this facilitates crimping a terminal on the exposed wire core 2 as needed.

While only a limited number of specific embodiments of the present Invention have been expressly disclosed, it is, nonetheless, to be broadly construed and not to be limited except by the character of the claims appended hereto.

What we claim is:

1. A method for the production of a waterproof cable comprising a plurality of conductive strands, each having a strand surface, twisted together to form a wire core having a core surface and interstices between adjacent said strands, an insulating layer surrounding said wire core, said method comprising dissolving or dispersing a water-absorptive swellable powder in a solvent to form a liquid mixture;

application of said mixture to each said strand surface, wherein said application is accomplished by a step selected from the group consisting of:

spraying said liquid mixture on each said strand surface, immersing each of said strands in said liquid mixture, and dripping said liquid mixture on each of said strands;

thereafter twisting said strands to form said wire core;

evaporating said solvent from said mixture applied to said strand surface by heating said twisted strands; and coating said wire core with said insulation layer.

2. The method of claim 1 wherein said powder is a resin.

3. The method of claim 1 wherein said powder is selected from the group consisting of starch/acrylic acid graft copolymers, polyacrylic acid chloride, and gelatinized vinylacetate-acrylic ester graft copolymers.

4. The method of claim 1 wherein said powder has an average particle size of 1 µm to 50 µm.

5. The method of claim 4 wherein said particle size is 5 µm to 10 µm.

6. The method of claim 1 wherein said application is to longitudinally spaced apart regions, there being no said application to spaces between successive said regions.

7. The method of claim 6 wherein said regions are adjacent ends of said cable.

8. The method of claim 1 wherein said powder is eliminated from said core surface before said coating.

9. The method of claim 8 wherein said powder is eliminated from said core surface before said evaporating.

10. The method of claim 1 wherein said solvent is organic.

11. The method of claim 10 wherein said solvent is toluene.

* * * * *